(12) United States Patent
Sesink (10) Patent No.: US 9,997,909 B2
(45) Date of Patent: Jun. 12, 2018

(54) SURGE PROTECTION DEVICE

(75) Inventor: Gerardus Wilhelmus Cornelis Sesink, Heeze (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 5 days.

(21) Appl. No.: 14/131,923

(22) PCT Filed: Jul. 5, 2012

(86) PCT No.: PCT/IB2012/053440
§ 371 (c)(1),
(2), (4) Date: Jan. 10, 2014

(87) PCT Pub. No.: WO2013/008152
PCT Pub. Date: Jan. 17, 2013

(65) Prior Publication Data
US 2014/0168833 A1   Jun. 19, 2014

Related U.S. Application Data

(60) Provisional application No. 61/507,168, filed on Jul. 13, 2011.

(51) Int. Cl.
*H02H 1/00* (2006.01)
*H02H 9/04* (2006.01)
(Continued)

(52) U.S. Cl.
CPC .......... *H02H 9/043* (2013.01); *H02H 9/042* (2013.01); *H02H 9/06* (2013.01); *H01C 7/12* (2013.01)

(58) Field of Classification Search
CPC .......... H02H 9/042; H02H 9/043; H02H 3/22; H02H 9/06
(Continued)

(56) References Cited

U.S. PATENT DOCUMENTS 4,140,965 A  *  2/1979  Neal .............................. 324/551
5,321,575 A  *  6/1994  Shilo ..................... H02H 9/041
                                                         361/111
(Continued)

FOREIGN PATENT DOCUMENTS

CN        1360380 A      7/2002
CN     201113420 Y       9/2008
(Continued)

OTHER PUBLICATIONS

"Protecting LED Systems in Accodance With IEEE & ANSI C62. 41.2", Transient Surge Requirements, Apr. 2011, pp. 1-4.

*Primary Examiner* — Thienvu Tran
*Assistant Examiner* — Lucy Thomas
(74) *Attorney, Agent, or Firm* — Akarsh P. Belagodu (57) ABSTRACT

Disclosed is a surge protection device (10, 110) for an outdoor lighting fixture that includes a live connection (23A, 123A), a neutral connection (23B, 123B), and a ground connection (23C, 123C). A first varistor (42) and a second varistor (43) may be electrically connected to one another in a series connection between the live and neutral connections and a third varistor (41) electrically connected between the live and neutral connections in a parallel configuration with the first varistor and the second varistor. A surge arrestor (46, 146) may also be electrically connected between the ground connection (23C, 123C) and the series connection between the first varistor and the second varistor.

15 Claims, 3 Drawing Sheets

(51) Int. Cl.
*H02H 9/06* (2006.01)
*H01C 7/12* (2006.01)

(58) Field of Classification Search
USPC .................................................. 361/126, 127
See application file for complete search history.

(56) References Cited

U.S. PATENT DOCUMENTS

| | | | |
|---|---|---|---|
| 5,353,189 A * | 10/1994 | Tomlinson | 361/118 |
| 5,956,223 A | 9/1999 | Banting | |
| 6,282,075 B1 * | 8/2001 | Chaudhry | 361/111 |
| 6,296,377 B1 * | 10/2001 | Wilson et al. | 362/370 |
| 6,947,266 B1 * | 9/2005 | Billingsley | H02H 5/105 |
| | | | 361/104 |
| 2002/0054465 A1 * | 5/2002 | Gerlach | H01T 4/06 |
| | | | 361/111 |
| 2003/0099073 A1 * | 5/2003 | Anamura | H02H 1/0038 |
| | | | 361/42 |
| 2008/0001782 A1 * | 1/2008 | That | B64F 1/20 |
| | | | 340/947 |
| 2008/0273331 A1 * | 11/2008 | Moss et al. | 362/294 |
| 2010/0013402 A1 | 1/2010 | Chaffai et al. | |
| 2010/0110684 A1 | 5/2010 | Abdelsamed et al. | |
| 2010/0127625 A1 * | 5/2010 | Minarczyk et al. | 315/119 |

FOREIGN PATENT DOCUMENTS

| | | | |
|---|---|---|---|
| CN | 201318651 Y | | 9/2009 |
| CN | 201450329 U | | 5/2010 |
| CN | 201636674 U | | 11/2010 |
| CN | 101950956 A | | 1/2011 |
| JP | 0739136 A | | 2/1995 |
| JP | 10313532 A | | 11/1998 |
| KR | 20080020718 A | | 3/2008 |
| WO | WO2012/143871 | * | 10/2012 |
| WO | 2012147005 A1 | | 11/2012 |

* cited by examiner

SURGE PROTECTION DEVICE

TECHNICAL FIELD

The present invention is directed generally to surge protection. More particularly, various inventive methods and apparatus disclosed herein relate to a surge protection device that may be utilized in a lighting fixture.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications Traditional fluorescent, HID, and incandescent lighting fixtures are often equipped with power supplies that are relatively resistant to power surges or other electrical stresses. However, it may desirable to provide extra protection for the power supplies of such traditional fixtures and/or for power supplies or other electronics of LED-based lighting fixtures. For example, some LED-based outdoor lighting fixtures may implement power supplies that are sensitive to power surges and other electrical stresses and it may be desirable to implement surge protection in such a device. However, existing surge protection devices may suffer from one or more drawbacks and/or may not be adaptable for utilization with a lighting fixture. For example, such surge protection devices may not have a sufficient clamping voltage, may not be suitable for outdoor lighting applications, and/or may not provide surge protection for both Class I and Class II lighting applications.

Thus, there is a need in the art to provide a surge protection device that may be implemented in a lighting fixture and that may optionally overcome one or more drawbacks associated with existing surge protection devices.

SUMMARY

The present disclosure is directed to inventive methods and apparatus for surge protection. For example, in some embodiments a surge protection device for an outdoor lighting fixture may be provided that includes a live connection, a neutral connection, and a ground connection. A first varistor and a second varistor may be electrically connected to one another in a series connection between the live connection and the neutral connection and a third varistor electrically connected between the live connection and the neutral connection in a parallel configuration with the first and second varistor. A surge arrestor may be electrically connected between the ground connection and the series connection between the first varistor and the second varistor. The surge protection device may optionally provide surge protection for both Class I and Class II lighting applications. In Class II applications any conductive part of a lighting fixture within which the surge protection device is installed may be used as functional earth in order to provide necessary protection to one or more electrical components. During type testing of a lighting fixture within which the surge protection device is installed, the surge protection device may optionally be removed to ensure functional isolation of the lighting fixture is tested.

Generally, in one aspect, a combination Class I and Class II surge protection device for an outdoor lighting fixture may be provided that includes a housing supporting a live connection, a neutral connection, and a ground connection. The live connection, the neutral connection, and the ground connection each have a power source input and an outdoor power supply output electrically connected to the power source input. A plurality of varistors are also provided within the housing. The varistors include a first varistor and a second varistor electrically connected to one another in a series connection between the live connection and the neutral connection, and a third varistor electrically connected between the live connection and the neutral connection in a parallel configuration with the first varistor and the second varistor. A surge arrestor is also provided electrically connected between the ground connection and the series connection between the first varistor and the second varistor.

In some embodiments, a differential mode circuit clamping voltage between the live connection and the neutral connection is less than fifteen hundred volts.

In some embodiments, a common mode circuit clamping voltage between the live connection and the ground connection and between the neutral connection and the ground connection is less than three thousand volts. The surge arrestor could be a multi electrode arrestor.

In some embodiments, the power source input and the outdoor power supply output of each of the live connection, the neutral connection, and the ground connection are coupled to a single connector of respective of the live connection, the neutral connection, and the ground connection. In some versions of those embodiments, each connector forms part of a keyed contact block.

Generally, in another aspect, a lighting fixture is provided that includes a light source, electronics electrically coupled to and powering the light source, and a surge protection device. The surge protection device has a housing supporting a live connection, a neutral connection, and a ground connection. At least the live connection and the neutral connection are electrically coupled to the electronics. The live connection and the neutral connection each have a power source input. A plurality of varistors are sealingly enclosed within the housing of the surge protection device. The varistors include a first varistor and a second varistor electrically connected to one another in a series connection between the live connection and the neutral connection, and a third varistor electrically connected between the live connection and the neutral connection in a parallel configuration with the first varistor and the second varistor. The surge protection device also includes a surge arrestor electrically connected between the ground connection and the series connection between the first varistor and the second varistor.

In some embodiments, a differential mode circuit clamping voltage between the live connection and the neutral connection is less than fifteen hundred volts. A common mode circuit clamping voltage between the live connection and the ground connection and between the neutral connection and the ground connection could be less than three thousand volts.

In some embodiments, a differential mode circuit clamping voltage between the live connection and the neutral connection is less than an isolation testing voltage of the lighting fixture. Also, the housing of the surge protection device can be potted.

In some embodiments, the light source is a LED-based light source. In some versions of those embodiments the electronics include a LED driver.

In some embodiments, the ground connection has a ground power source input of the power source input. In some versions of those embodiments the ground connection is electrically coupled to the electronics.

Generally, in another aspect, a surge protection device for an outdoor lighting fixture is provided and includes a housing supporting a live connection, a neutral connection, and a ground connection. The live connection and the neutral connection each have a power source input and an outdoor power supply output electrically connected to the power source input. The ground connection is connectable to at least one of a ground and an outdoor lighting fixture functional ground. A plurality of varistors are provided within the housing. The varistors include a first varistor and a second varistor electrically connected to one another in a series connection between the live connection and the neutral connection, and a third varistor electrically connected between the live connection and the neutral connection in a parallel configuration with the first varistor and the second varistor. A surge arrestor is electrically connected between the ground connection and the series connection between the first varistor and the second varistor. A differential mode circuit clamping voltage between the live connection and the neutral connection is less than two thousand volts.

In some embodiments, a common mode circuit clamping voltage between the live connection and the ground connection and between the neutral connection and the ground connection is less than three thousand volts. Also, the differential mode circuit clamping voltage between the live connection and the neutral connection could be less than fifteen hundred volts.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Traditional lighting fixtures are often equipped with power supplies that are relatively resistant to power surges or other electrical stresses. However, it may desirable in some lighting fixture implementations (traditional or otherwise) to provide extra protection for the power supplies and/or other electronics. For example, some LED-based outdoor lighting fixtures may implement sensitive power supplies and it may be desirable to implement surge protection in combination with such a power supply. However, existing surge protection devices may suffer from one or more drawbacks and/or may not be adaptable for utilization with a lighting fixture.

Thus, there is a need in the art to provide a surge protection device that may be implemented in a lighting fixture and that may optionally overcome one or more drawbacks associated with existing surge protection devices.

Applicant has recognized and appreciated that it would be beneficial to provide a surge protection device that includes a plurality of varistors and a surge arrestor.

In view of the foregoing, various embodiments and implementations of the present invention are directed to surge protection.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the surge protection device disclosed herein are particularly suited for and described in combination with LED drivers and a LED-based lighting fixture. Accordingly, for illustrative purposes, the claimed invention is discussed in conjunction with components of a LED-based lighting fixture. However, other configurations and applications of the surge protection device are contemplated without deviating from the scope or spirit of the claimed invention. For example, in some embodiments the surge protection device may be implemented in combination with other electronics of a lighting fixture (e.g., controller(s), transformer(s), motion sensor(s), dimming module(s), and/or photo sensor(s)), another non-LED power supply, and/or with one or more other lighting fixture.

Figure 1:
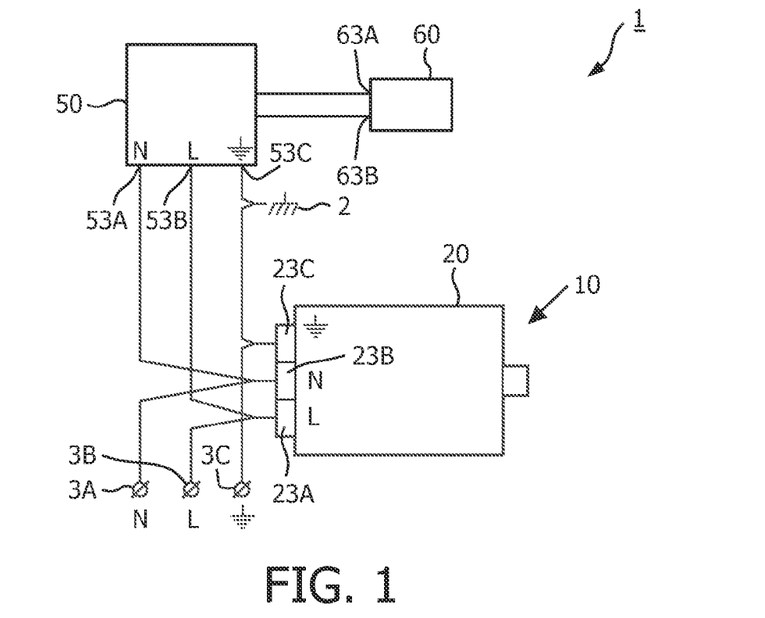
FIG. 1 illustrates an embodiment of a surge protection device implemented within a LED-based lighting fixture.

Referring to FIG. 1, in one embodiment, a surge protection device 10 may be implemented in a LED-based lighting fixture 1. A power source neutral output 3A, power source live output 3B, and a power source ground output 3C of a power source are illustrated in combination with the LED-based lighting fixture 1. The power source outputs 3A-C are electrically coupled to respective of live, neutral, and ground connections 23A, 23B, and 23C that are supported by a housing 20 of surge protection device 10. The power source outputs 3A-3C may be from a mains power source such as, for example, a 120 Volt or a 277 Volt mains power source. The mains power source may be directly coupled to the surge protection device 10 in some embodiments or one or more intermediary connections may optionally be interposed between the mains power source and the surge protection device 10 in other embodiments. In some situations the mains power source may not contain a power source ground output 3C and/or intermediary connections may not contain a ground output. As discussed herein, the surge protection device 10 may still be utilized in such situations to provide surge protection to the lighting fixture 1.

The connections 23A-C are also electrically connected to respective LED driver inputs 53A-C of an LED driver 50. The LED driver 50 has positive and neutral DC outputs that are provided to respective of positive input 63A and neutral input 63B of LED-based light source 60. In some embodiments a transformer may optionally be interposed between the surge protection device 10 and the LED driver 50 to alter the voltage of the surge protected mains power. A lighting fixture functional ground 2 is also graphically depicted in FIG. 1 and is shown electrically coupled to the ground wiring extending between the surge protection device 10 and the LED driver 50. The functional ground 2 may be any metal or other conductive structure of the luminaire 1 such as, for example, a lighting fixture chassis.

Electrical connections between the main power supply, the surge protection device 10, and/or the LED driver 50 may included insulated bundled or non-bundled wiring. Also, the various connections may optionally be made utilizing one or more plug/receptacle type connections in some embodiments. Although the connections 23A-C each operate as both a mains power source input (from outputs 3A-C) and a power supply output (to inputs 53A-C), in alternative embodiments separate connections may be provided—one serving as a mains power supply input and the other serving as a power supply output. Although a particular lighting fixture 1 is illustrated herein, one of ordinary skill in the art, having had the benefit of the instant disclosure, will recognize and appreciate that alternative lighting fixtures may incorporate an embodiment of the surge protection device described herein. For example, in some embodiments the lighting fixture may not include any LEDs, may include an occupancy sensor, and/or may include a dimming module.

Figure 2:
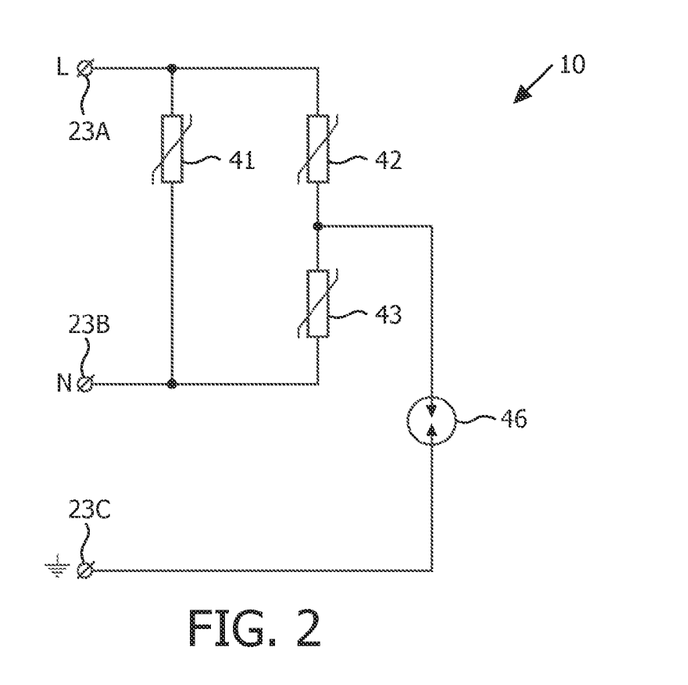
FIG. 2 illustrates a schematic of the surge protection device of FIG. 1.

Referring to FIG. 2, a schematic of the surge protection device 10 of FIG. 1 is illustrated. The surge protection device 10 includes a first varistor 41, a second varistor 42, and a third varistor 43. The first varistor 41 is in electrical communication with the live connection 23A and the neutral connection 23B. The second varistor 42 is in electrical communication with the live connection 23A and one leg of the third varistor 43. The third varistor 43 is in electrical communication with one leg of the second varistor 42 and the neutral connection 23B. The second and third varistors 42 and 43 are in series connection with one another and are connected between the live and neutral connections 23A, 23B. The second and third varistors 42 and 43 are also connected in parallel with the first varistor 41. A surge arrestor 46 extends from the series connection between the second and third varistors 42 and 43 to the ground connection 23C. In some implementations the ground connection 23C will not be connected to ground of the mains power supply. For example, in Class II lighting fixtures the ground connection 23C may only be connected to the lighting fixture functional ground 2. The functional ground 2 may be connected, for example, via ground wiring extending between the surge protection device 10 and the LED driver 50 and/or through a separate connection to the surge protection device 10.

The depicted varistor and surge arrestor implementation may provide surge protection for both Class I (grounded lighting fixture) and Class II (not grounded) lighting fixtures. In some embodiments the varistors may be Metal Oxide Varistors (MOVs). In some versions of those embodiments the varistors may be B72220Q0321K101 MOVs available from EPCOS of Munich, Germany. In some embodiments the surge arrestor 46 may be a 2-electrode arrestor. In some versions of those embodiments the surge arrestor 46 may be a B88069X2880S102 arrestor available from EPCOS of Munich, Germany. In some embodiments the surge arrestor 46 may include two or more arrestors electrically coupled to one another in a parallel configuration. The type of varistors and surge arrestor utilized may depend on, inter alia, the characteristics of the mains voltage. For example, if the mains voltage is 120V then 150V varistors may be used, if it is 230V then 320V varistors may be used, if it is 277V then 320V varistors may be used, and if it is 347V then 440V varistors may be used.

Certain embodiments of the surge protection device 10 may provide a clamping voltage of less than 1500 Volts between phases (Differential Mode circuit, DM) and a clamping voltage of less than 3000 Volts between phase and ground (Common Mode circuit, CM). The surge protection device 10 may also optionally be a separate stand alone part that is removable during isolation testing. Thus, in some embodiments the surge protection device 10 may have a protection level voltage that is less than the voltage utilized during isolation testing. For example, in some embodiments the DM clamping voltage may be less than 1.5 kV, the CM clamping voltage may be less than 3.0 kV and the voltage utilized in isolation testing may approach or exceed 4.0 kV.

Figure 3:
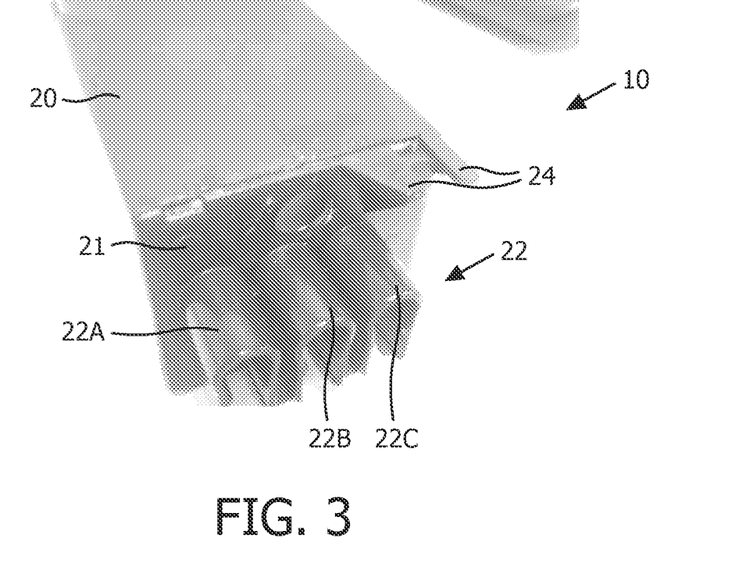
FIG. 3 illustrates a perspective view of exterior portions of the surge protection device of FIG. 1.

FIG. 3 illustrates a perspective view of exterior portions of the surge protection device 10 of FIG. 1. The housing 20 surrounds the varistors 41-43 and the surge arrestor 46 and includes a connector plate 21 forming an end thereof. The connector plate 21 supports a connector block 22 having a live connector 22A, a neutral connector 22B, and a grounded connector 22C. The connector block 22 is keyed to interface with a corresponding releasable connector that includes electrical wiring and/or one or more connections for connecting to LED driver 50 and the power source. The connectors 22A-C each provide access to, and/or include conductive structure in electrical communication with, respective of connections 23A-C. An extension 24 extends perpendicularly away from connector plate 21 and contains a slot therein. The slot may receive a screw or other fastener for securing the surge protection device 10 within lighting fixture 1. In some embodiments such a screw may attach to the functional ground 2 of the lighting fixture 1 and the extension 24 may optionally be in electrical communication with the ground connection 23C. The housing 20 may provide resistance from shock, vibration, and/or dust to the varistors 41-43 and the surge arrestor 46. In some embodiments the housing 20 may be manufactured from a metal and/or a polymer and may optionally be sealed at intersection points utilizing one or more sealing compounds. In those embodiments where the housing 20 is metal, it may be necessary to provide sufficient creepage distance to the mains terminals.

Although a specific connector block 22 is illustrated herein, one of ordinary skill in the art having had the benefit of the present disclosure will recognize and appreciate that in alternative embodiments one or more alternative connection blocks may be provided and/or may be alternatively positioned. For example, in some embodiments a screw type connection may be provided to attach one or more wires to the surge protection device 10. Also, for example, in some embodiments wire nuts may be utilized. Also, for example, in some embodiments a spring biased clamp and/or a quick connection structure that retains wiring once inserted therethrough may be provided. Such quick connection structure may optionally be tool-less and may optionally allow for releasing of the wiring once inserted or, alternatively, may fixedly and non-releasably retain the wiring. Also, for example, in alternative embodiments the arrangement of the live, neutral, and ground connections may be different. Also, for example, in some embodiments two or more separate connector blocks may be provided—one for input from a power source and one or more for output to electronics.

Figure 4:
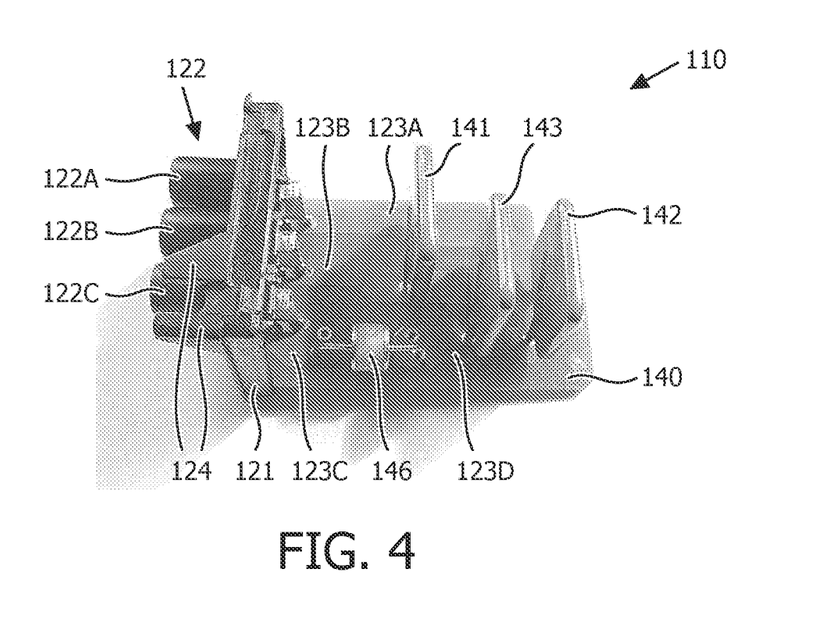
FIG. 4 illustrates an upper perspective view of a second embodiment of a surge protection device with portions of the housing removed to better illustrate internal components thereof.

FIG. 4 illustrates an upper perspective view of a second embodiment of a surge protection device 110 with portions of the housing removed to better illustrate internal components thereof. Only the connector plate 121 of the housing is illustrated in FIG. 4 along with the connector block 122 supported thereby. The connector block 122 has a live connector 122A, a neutral connector 122B, and a grounded connector 122C. The connectors 122A-C each provide access to, and/or include structure in electrical communication with, respective of connections 123A-C. The connections 123A-C are provided as traces in a circuit board 140 in the illustrated embodiment. First varistor 141 extends between live connection 123A and neutral connection 123B. Second varistor 142 extends between live connection 123A and series connection pad 123D and third varistor 143 extends between neutral connection 123B and series connection pad 123D. Surge arrestor 146 extends between series connection pad 123D and ground connection 126C. The configuration of varistors 141-143 and surge arrestor 146 is the same as that depicted in FIG. 2. An extension 124 extends perpendicularly away from connector plate 121 and contains a slot therein.

Figure 5:
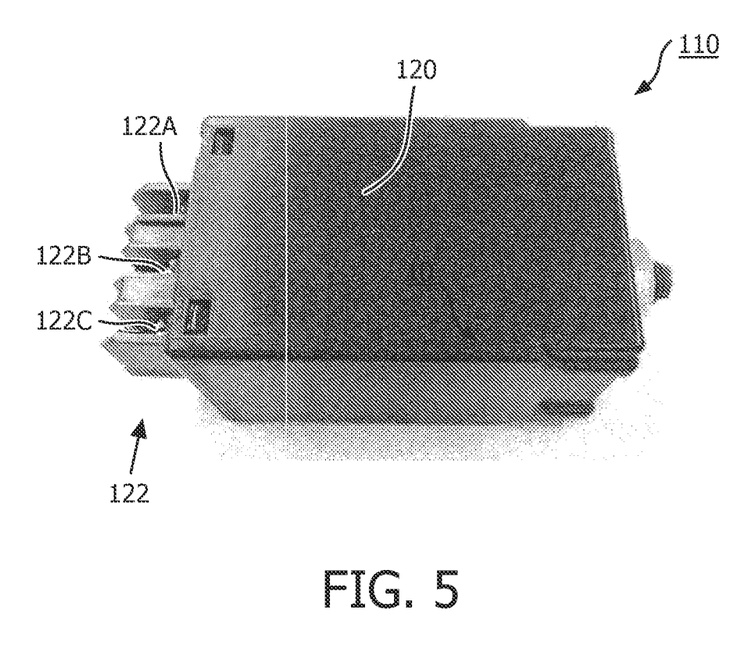
FIG. 5 illustrates a lower perspective view of the surge protection device of FIG. 4 with the housing fully intact.

FIG. 5 illustrates a lower perspective view of the surge protection device 110 of FIG. 4 with the housing 120 fully intact. The housing 120 encloses the circuit board 140, the varistors 141-143, and the surge arrestor 146. The housing 120 may optionally comprise a polymer in some embodiments. In some versions of those embodiments the housing 120 may include one or more potted portions.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses are provided merely for convenience and should not be viewed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A lighting fixture, comprising;
 a light source;
 electronics electrically coupled to and powering said light source;
 a removable surge protection device having:
  (i) a housing supporting a live connection, a neutral connection, and a ground connection; said live connection, said neutral connection, and said ground connection each having a power source input, and said ground connection additionally having an input for a functional ground, wherein said functional ground is a conductive structure of the lighting fixture;
  (ii) a plurality of varistors enclosed within said housing, said plurality of varistors including a first varistor and a second varistor electrically connected to one another in a series connection between said live connection and said neutral connection, and a third varistor electrically connected between said live connection and said neutral connection in a parallel configuration with said series connection of said first varistor and said second varistor; and
  (iii) a surge arrestor electrically connected between said ground connection and an intermediary of said series connection between said first varistor and said second varistor.

2. The lighting fixture of claim 1, wherein a differential mode circuit clamping voltage between said live connection and said neutral connection is less than fifteen hundred volts.

3. The lighting fixture of claim 2, wherein a common mode circuit clamping voltage between said live connection and said ground connection and between said neutral connection and said ground connection is less than three thousand volts.

4. The lighting fixture of claim 1, wherein a common mode circuit clamping voltage between said live connection and said ground connection and between said neutral connection and said ground connection is less than three thousand volts.

5. The lighting fixture of claim 1, wherein a differential mode circuit clamping voltage between said live connection and said neutral connection is less than an isolation testing voltage of said lighting fixture.

6. The lighting fixture of claim 1, wherein said housing is potted.

7. The lighting fixture of claim 1, wherein said power source input of each of said live connection, said neutral connection, and said ground connection are coupled to a single connector of respective of said live connection, said neutral connection, and said ground connection.

8. The lighting fixture of claim 7, wherein each said connector forms part of a keyed contact block.

9. The lighting fixture of claim 8, wherein said electronics is electrically coupled to said respective of said live connection, said neutral connection, and said ground connection via said single connector.

10. The lighting fixture of claim 1, wherein said lighting fixture functional ground input includes an extension extending away from the housing of the surge protection device.

11. The lighting fixture of claim 10, wherein said extension includes a slot configured to receive a fastener.

12. The lighting fixture of claim 1, further comprising:
 a lighting fixture functional ground electrically coupled to an electrically conductive chassis of the lighting fixture.

13. The lighting fixture of claim 1, further comprising:
 a live conductor electrically coupling a power source and the electronics;
 a neutral conductor electrically coupling the power source and the electronics;
 a ground conductor electrically coupling the power source, the lighting fixture functional ground, and the electronics;
 wherein said light source is an LED-based light source;
 wherein said electronics include an LED driver;
 wherein the housing supporting the live connection is electrically coupled to the live conductor, the neutral connection is electrically coupled to the neutral conductor, and the ground connection is electrically coupled to the ground conductor;
 wherein the surge protection device is configured to function as a current sink during a power surge.

14. The lighting fixture of claim 1, wherein said ground connection power source input is utilized for Class I lighting applications and said functional ground input is utilized for Class II lighting applications.

15. A removable surge protection device for an outdoor lighting fixture, comprising:
- a housing supporting a live connection, a neutral connection, and a ground connection; said live connection, said neutral connection, and said ground connection each having a power source input, and said ground connection additionally having an input for a functional ground, wherein said functional ground is a conductive structure of the lighting fixture;
- a plurality of varistors within said housing, said plurality of varistors including a first varistor and a second varistor electrically connected to one another in a series connection between said live connection and said neutral connection, and a third varistor electrically connected between said live connection and said neutral connection in a parallel configuration with said series connection of said first varistor and said second varistor; and
- a surge arrestor electrically connected between said ground connection and an intermediary of said series connection between said first varistor and said second varistor.

* * * * *